(12) United States Patent
Dong et al.

(10) Patent No.: US 10,771,431 B2
(45) Date of Patent: Sep. 8, 2020

(54) SYNCHRONIZING IP INFORMATION OF VIRTUAL MACHINES

(71) Applicant: Lenovo Enterprise Solutions (Singapore) Pte. Ltd., Singapore (SG)

(72) Inventors: Xiang H. Dong, Wuxi (CN); Shi X. Ruan, Wuxi (CN); Yun Sun, Wuxi (CN); Zheng D. Zhu, Wuxi (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 416 days.

(21) Appl. No.: 14/216,631

(22) Filed: Mar. 17, 2014

(65) Prior Publication Data
US 2014/0297889 A1 Oct. 2, 2014

(30) Foreign Application Priority Data

Mar. 27, 2013 (CN) .......................... 2013 1 0101478

(51) Int. Cl.
*H04L 29/12* (2006.01)
*G06F 9/455* (2018.01)

(52) U.S. Cl.
CPC ...... *H04L 61/2076* (2013.01); *G06F 9/45533* (2013.01); *G06F 9/45558* (2013.01);
(Continued)

(58) Field of Classification Search
CPC .............. H04L 61/103; H04L 61/2076; H04L 61/2015; G06F 9/45533; G06F 9/45558; G06F 2009/45595
(Continued)

(56) References Cited

U.S. PATENT DOCUMENTS

| 6,219,715 B1 * | 4/2001 | Ohno | ................ H04L 29/12216 370/401 |
| 6,697,360 B1 * | 2/2004 | Gai | ..................... H04L 41/0886 370/389 |

(Continued)

FOREIGN PATENT DOCUMENTS

| CN | 102136931 A | 7/2011 |
| CN | 102694672 A | 9/2012 |

(Continued)

OTHER PUBLICATIONS

Droms, R., Dynamic Host Configuration Protocol, RFC 2131, [online], Mar. 1997, whole document, [retrieved on Jul. 10, 2017]. Retrieved from the Internet:<URL:https://tools.ietf.org/pdf/rfc2131.pdf>.*

(Continued)

*Primary Examiner* — Abdullahi E Salad (57) ABSTRACT

One embodiment discloses a method and apparatus for synchronizing IP information of virtual machines. The method includes: obtaining an IP relevant message of at least one virtual machine within a subnet, recording IP information and connection information of the at least one virtual machine based on the IP relevant message, and modifying connection information of a specific virtual machine in response to migration of the specific virtual machine. The apparatus corresponds to the method. With the method and apparatus above, IP information and connection information of respective virtual machines within the subnet are recorded regularly and routinely. Once a certain virtual machine is migrated, updating and modifying connection information of the migrated virtual machine is only needed, but without a need for resending a request to the Dynamic Host Configuration Protocol (DHCP) server. Thus, network disrup- (Continued)

tions caused by non-synchronization of IP information when the virtual machine is migrated are avoided.

20 Claims, 6 Drawing Sheets

(52) U.S. Cl.
CPC .. *H04L 61/103* (2013.01); *G06F 2009/45595* (2013.01); *H04L 61/2015* (2013.01)

(58) Field of Classification Search
USPC .......................................................... 709/245
See application file for complete search history.

(56) References Cited

U.S. PATENT DOCUMENTS

| | | | | |
|---|---|---|---|---|
| 6,826,611 | B1* | 11/2004 | Arndt | H04L 29/12216 370/252 |
| 7,114,070 | B1* | 9/2006 | Willming | H04L 29/12273 380/30 |
| 8,213,336 | B2 | 7/2012 | Smith et al. | |
| 8,615,015 | B1* | 12/2013 | Shekhar | H04L 45/54 370/256 |
| 2003/0185233 | A1* | 10/2003 | Ji | H04L 12/5692 370/466 |
| 2004/0236845 | A1* | 11/2004 | Murakami | H04L 12/40091 709/222 |
| 2005/0041596 | A1* | 2/2005 | Yokomitsu | H04L 29/12283 370/252 |
| 2005/0114492 | A1* | 5/2005 | Arberg | H04L 29/1282 709/223 |
| 2006/0126535 | A1* | 6/2006 | Sherman | H04W 84/005 370/254 |
| 2006/0248229 | A1* | 11/2006 | Saunderson | H04L 12/4641 709/245 |
| 2008/0095138 | A1* | 4/2008 | Wu | H04L 29/12301 370/342 |
| 2008/0165778 | A1* | 7/2008 | Ertemalp | H04L 12/4641 370/392 |
| 2009/0083406 | A1* | 3/2009 | Harrington | G06F 15/16 709/222 |
| 2009/0193103 | A1* | 7/2009 | Small | H04L 12/462 709/221 |
| 2009/0296567 | A1* | 12/2009 | Yasrebi | H04L 29/12028 370/221 |
| 2010/0172293 | A1* | 7/2010 | Toth | H04L 29/12028 370/328 |
| 2010/0228837 | A1* | 9/2010 | Squire | H04L 41/084 709/220 |
| 2010/0293225 | A1* | 11/2010 | Sebes | H04L 63/10 709/203 |
| 2010/0309813 | A1* | 12/2010 | Singh | H04L 12/2801 370/254 |
| 2011/0158208 | A1* | 6/2011 | Solanki | H04L 12/185 370/338 |
| 2011/0205904 | A1* | 8/2011 | Nakagawa | H04L 12/18 370/241 |
| 2011/0246669 | A1* | 10/2011 | Kanada | G06F 9/4856 709/238 |
| 2012/0084840 | A1* | 4/2012 | Higuchi | H04L 49/354 726/4 |
| 2012/0089713 | A1* | 4/2012 | Carriere | H04L 12/4641 709/222 |
| 2012/0110181 | A1 | 5/2012 | Tsirkin | |
| 2012/0127975 | A1* | 5/2012 | Yang | H04W 12/06 370/338 |
| 2012/0233282 | A1* | 9/2012 | Voccio | G06F 9/45558 709/212 |
| 2012/0246282 | A1 | 9/2012 | Oguchi | |
| 2013/0031235 | A1* | 1/2013 | Yin | G06F 13/102 709/223 |
| 2013/0067026 | A1* | 3/2013 | Hershko | H04L 61/106 709/217 |
| 2013/0166737 | A1* | 6/2013 | Christenson | H04L 69/40 709/224 |
| 2013/0198808 | A1* | 8/2013 | Thomson | H04L 63/205 726/4 |
| 2013/0227674 | A1* | 8/2013 | Anderson | H04L 63/1441 726/15 |
| 2013/0275574 | A1* | 10/2013 | Hugard, IV | H04L 63/10 709/224 |
| 2013/0311991 | A1* | 11/2013 | Li | H04L 61/103 718/1 |
| 2014/0007100 | A1* | 1/2014 | Gu | G06F 9/45558 718/1 |
| 2014/0140244 | A1* | 5/2014 | Kapadia | H04L 61/103 370/255 |
| 2014/0280846 | A1* | 9/2014 | Gourlay | H04L 41/0853 709/223 |

FOREIGN PATENT DOCUMENTS

| | | | | |
|---|---|---|---|---|
| WO | WO2012094898 | | 7/2012 | |
| WO | WO 2012094898 A1 * | | 7/2012 | .......... H04L 61/103 |
| WO | WO2012126254 | | 9/2012 | |

OTHER PUBLICATIONS

Woundy, R., Dynamic Host Configuration Protocol (DHCP) Leasequery, RFC 4388, [online], Feb. 2006, whole document, [retrieved on Jul. 24, 2017]. Retrieved from the Internet:<URL:https://tools.ietf.org/pdf/rfc4388.pdf>.*

Li, Y., "Problem statement on address resolution in virtual machine migration," Oct. 18, 2010, pp. 1-4.

* cited by examiner

Fig. 1

| MAC address | IP address | Port | VLAN | Lease(s) |
|---|---|---|---|---|
| 00:25:03:f8:8f:23 | 172.31.5.23 | 6 | 100 | 86400 |
| 00:25:03:f8:8f:24 | 172.31.5.24 | 7 | 200 | 34582 |

| Virtual Machine | MAC address | IP address | Port | VLAN | Lease(s) | Connection status |
|---|---|---|---|---|---|---|
| VM1 | MAC1 | IP1 | 1 | 100 | 86400 | Active |
| VM2 | MAC2 | IP2 | 1 | 200 | 34582 | Active |
| VM3 | MAC3 | IP3 | 1 | 100 | 36855 | Active |
| VM4 | MAC4 | IP4 | 2 | 200 | 65200 | Active |
| VM5 | MAC5 | IP5 | --- | --- | 62300 | Inactive |
| VM6 | MAC6 | IP6 | --- | --- | 42600 | Inactive |

Fig. 6A

Trust Sub-list:

| Virtual Machine | MAC address | IP address | Port | VLAN | Lease(s) |
|---|---|---|---|---|---|
| VM1 | MAC1 | IP1 | 1 | 100 | 86400 |
| VM2 | MAC2 | IP2 | 1 | 200 | 34582 |
| VM3 | MAC3 | IP3 | 1 | 100 | 36855 |
| VM4 | MAC4 | IP4 | 2 | 200 | 65200 |

Standby Sub-list:

| Virtual Machine | MAC address | IP address | Port | VLAN | Lease(s) |
|---|---|---|---|---|---|
| VM5 | MAC5 | IP5 | --- | --- | 62300 |
| VM6 | MAC6 | IP6 | --- | --- | 42600 |

Fig. 6B

| Virtual Machine | MAC address | IP address | Port | VLAN | Lease(S) | Connection Status |
|---|---|---|---|---|---|---|
| VM1 | MAC1 | IP1 | 1 | 100 | 86400 | Active |
| VM2 | MAC2 | IP2 | 1 | 200 | 34582 | Active |
| VM3 | MAC3 | IP3 | 1 | 100 | 36855 | Active |
| VM4 | MAC4 | IP4 | 2 | 200 | 65200 | Active |
| *VM5* | *MAC5* | *IP5* | *2* | *300* | *62300* | *Active* |
| VM6 | MAC6 | IP6 | --- | --- | 42600 | Inactive |

| Virtual Machine | MAC address | IP address | Port | VLAN | Lease(s) | Connection status |
|---|---|---|---|---|---|---|
| *VM1* | *MAC1* | *IP1* | *2* | *100* | *86400* | *Active* |
| VM2 | MAC2 | IP2 | 1 | 200 | 34582 | Active |
| VM3 | MAC3 | IP3 | 1 | 100 | 36855 | Active |
| VM4 | MAC4 | IP4 | 2 | 200 | 65200 | Active |
| VM5 | MAC5 | IP5 | --- | --- | 62300 | Inactive |
| VM6 | MAC6 | IP6 | --- | --- | 42600 | Inactive |

SYNCHRONIZING IP INFORMATION OF VIRTUAL MACHINES

RELATED APPLICATIONS

This application claims priority to Chinese Patent Application No. 201310101478.9, filed Mar. 27, 2013, which is herein incorporated by reference.

BACKGROUND

The present invention relates to internet protocol (IP) information of virtual machines, and more particularly, to a method and apparatus for synchronizing IP information in migration of virtual machines.

With development of virtualization technologies, a virtual machine is able to provide various applications with services just like a real independent computer. As a virtual machine obtains its operating environment completely through software simulation, a plurality of virtual machines may be installed in a single physical platform, e.g., a server, and the plurality of virtual machines may operate separately and independently. Like a conventional host, a virtual machine obtains its IP addresses via a Dynamic Host Configuration Protocol (DHCP) to communicate with an external network.

Figure 1:
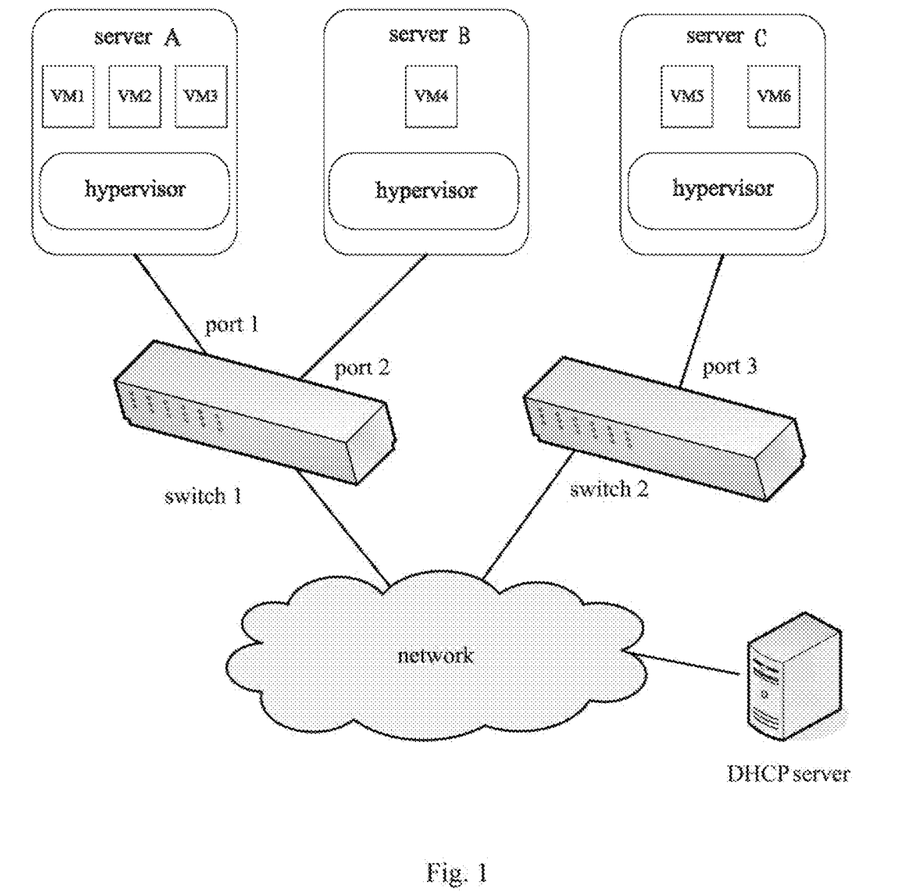
FIG. 1 shows a structure diagram of a virtual machine network.

FIG. 1 shows a structure diagram of a typical virtual machine network. Three physical platforms, i.e., servers A, B, and C, respectively, within a single subnet are shown in FIG. 1. A hypervisor runs at the lowest layer of each physical platform; by the hypervisor, one or more virtual machines may be installed as required. For instance, in the example in FIG. 1, three virtual machines are installed in server A, i.e., VM1, VM2, and VM3, respectively. One and two virtual machines are installed respectively in server B and server C.

In a typical network connection structure, respective servers are connected to (Ethernet) switches through ports and then connected to a network via the switches. For instance, in the example of FIG. 1, server A and server B are connected to a same switch 1 respectively through port 1 and port 2, while server C is connected to another switch 2 through port 3. When a virtual machine needs to connect with an external network, it first requests an IP address to a Dynamic Host Configuration Protocol (DHCP) server within the same subnet through a switch to which it is connected. In response to the request of the virtual machine, the DHCP server assigns an IP address for the requesting virtual machine in various assigning manners. Request and assignment of the IP address are realized via DHCP messages. In this process, a switch may execute a DHCP snooping mechanism to monitor a DHCP data packet between the virtual machine and the DHCP server. Through the DHCP snooping, the switch may build a trust list which records IP information of the virtual machine carried by the switch.

Figure 2:
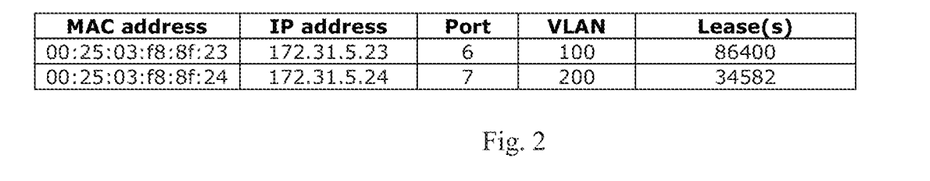
FIG. 2 shows a typical example of a trust list.

FIG. 2 shows a typical example of a trust list. In this typical example, the trust list includes a plurality of entries, each of which records IP relevant information of a virtual machine. Specifically, each entry records a MAC address, an assigned IP address, connecting port, corresponding Virtual Local Area Network (VLAN) identity as well as corresponding lease time of a virtual machine. Correspondingly, in the example of FIG. 1, the switch 1 uses a trust list similar to that in FIG. 2 to record IP relevant information of virtual machines VM1-VM4 it carries, and the switch 2 records IP relevant information of virtual machines VM5 and VM6 it carries. Furthermore, based on a built trust list, the switch may execute various safety related applications, such as IP Source Guide, dynamic ARP checking, etc., to allow only the traffic data which accords with the trust list to enter the switch.

On the other hand, in order to improve security and continuity of data storage, various data centers employ cross-platform or cross-site virtual machines for execution and management. In a plurality of conditions such as site maintenance, power adjustment, loads balancing between sites, it needs to migrate a virtual machine carried in the platform, that is, to move the virtual machines from one physical system to a different physical system. Currently, most corporations which provide host virtualization have their own specific virtual machine migration tools and support live migration of virtual machines.

In the process of migrating a virtual machine from a physical platform to another physical platform, switches related to the virtual machine need to update the network configuration thereof. As to static configuration, such as an Access Control List (ACL), Quality of Service (QoS), VLAN, etc., the prior art has given some methods to detect migration of a virtual machine and configure the static policies immediately. However, information such as an IP address obtained by a virtual machine from a DHCP server is generated dynamically by the virtual machine in a running process. The migration tools in the prior art cannot dynamically migrate the information generated dynamically in such a way, i.e., together with migration of the virtual machine. This may lead to virtual machine network service disruptions. For instance, when virtual machine VM1 is migrated from server A to server B, the connecting port thereof is changed from port 1 to port 2. As the port changes, IP relevant information of the VM1 does not comply with the records in the trust list maintained by switch 1 anymore, and thus security applications of switch 1 shall discard traffic data of VM1. When the virtual machine VM1 is migrated from server A to server C, switch 2 cannot find IP relevant information corresponding to the VM1 in the trust list it maintains, and thus it also rejects traffic data of VM1. Therefore, the network service related to VM1 would be disrupted.

In order to avoid network service disruptions caused by migration of a virtual machine, the prior art puts forward a solution of adding a migration bit. The solution is based on the Virtual Station Interface (VSI) Discovery and Configuration Protocol (VDP) under the IEEE 802.1Qbg standard. Specifically, a migration bit is added into the VDP request to indicate whether the virtual machine is migrated. Thus, when the virtual machine migrates, the switch into which the virtual machine migrates will receive a VDP request with the migration bit. Then, the switch will send a LeaseQuery with MAC address of the virtual machine to a DHCP server and recreate a trust list according to the message returned from the DHCP server. However, such a solution has the following disadvantages. As the switch needs to resend a request to a DHCP server and wait for the response, there must be a time delay. Particularly, when a virtual machine is migrated between different ports of a same switch, the request and response cause unnecessary waiting time. Furthermore, the request and response above are sent in the form of UDP data packets, which are at risk of being lost. Once data packets are lost, network service of the virtual machine would be seriously affected.

Therefore, it is desirable to have an improved solution which can synchronize IP relevant information of virtual machines in the process of migration of the virtual machines, so as to eliminate or reduce the time related to virtual machine network service disruptions and improve service performance of the virtual machines.

BRIEF SUMMARY

In consideration of the disadvantages of the prior art, the present invention is set forth to provide a solution for synchronizing IP information of virtual machines in condition of migration of the virtual machines.

According to embodiment, there is provided a method for synchronizing IP information of virtual machines in a switch, including: obtaining an IP relevant message of at least one virtual machine within a subnet; recording IP information and connection information of the at least one virtual machine based on the IP relevant message; and in response to migration of a specific virtual machine of the at least one virtual machine, modifying the connection information of the specific virtual machine.

According to another embodiment, there is provided an apparatus for synchronizing IP information of virtual machines, including: a message obtaining unit configured to obtain an IP relevant message of at least one virtual machine within a subnet; a recording unit configured to record IP information and connection information of the at least one virtual machine based on the IP relevant message; and a modifying unit configured to modify, in response to migration of a specific virtual machine of the at least one virtual machine, connection information of the specific virtual machine.

With the method and apparatus according to embodiments described herein, IP information and connection information of respective virtual machines within the subnet are recorded regularly. Once a certain virtual machine is migrated, it only needs to update and modify connection information of the certain virtual machine, but does not need to resend a request to the DHCP server. Thus, the embodiments described herein may avoid network disruptions caused by non-synchronization of IP information when the virtual machine is migrated.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
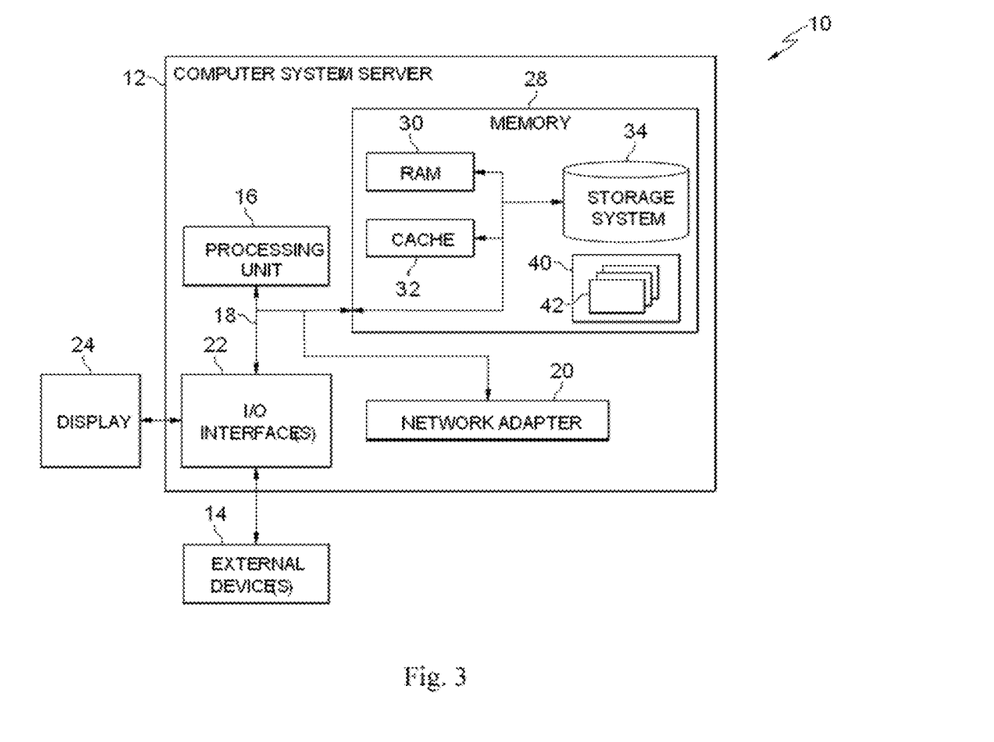
FIG. 3 shows a block diagram of an exemplary computer system/server according to one embodiment.

Referring now to FIG. 3, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 3, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Below, executing methods of the present invention are described with reference now to Figures and concrete examples. In the embodiments of the present invention, before a migration, a switch obtains IP information of respective virtual machines by snooping IP relevant messages of respective virtual machines within the same subnet, and records the IP information and connection information of respective virtual machines. As it obtains IP information of respective virtual machines in advance, once a certain virtual machine is migrated, the switch involved in the migration only needs to update connection information corresponding to the migrated virtual machine, without needing to resend a request to a DHCP server. Once the connection information is updated, the virtual machine can be used in the migrated new port immediately, and is avoided from network service disruptions. Below, implementation of the inventive concept above is described in combination with Figures.

Figure 4:
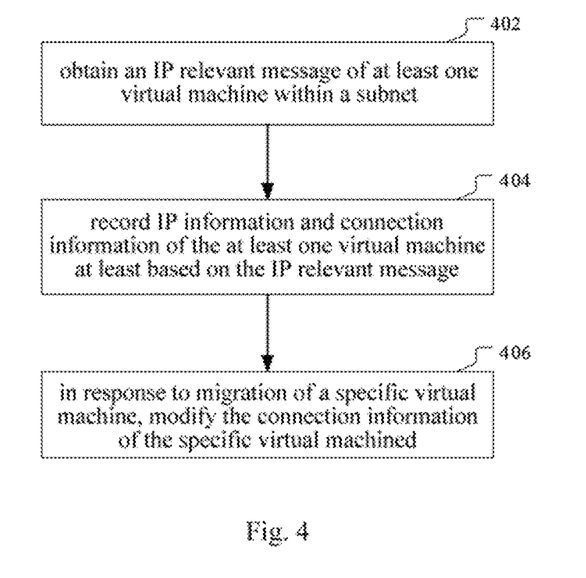
FIG. 4 shows a flow chart of a method according to one embodiment.

FIG. 4 shows a flow chart of a method according to an embodiment. As shown in FIG. 4, first, at step 402, an IP relevant message of at least one virtual machine within a subnet is obtained; at step 404, the IP information and connection information of the at least one virtual machine is recorded based on the IP relevant message, and at step 406, connection information of a specific virtual machine in the at least one virtual machine is modified in response to migration of the specific virtual machine. Below, concrete execution manners of respective steps above are described.

Specifically, first, at step 402, an IP relevant message of at least one virtual machine within a subnet is obtained. It will be appreciated that the IP relevant message above is an interactive message between the virtual machine with a DHCP server as to IP address of the virtual machine. In an embodiment, the interactive message includes an IP address confirmation message for obtaining the IP address.

Figure 5:
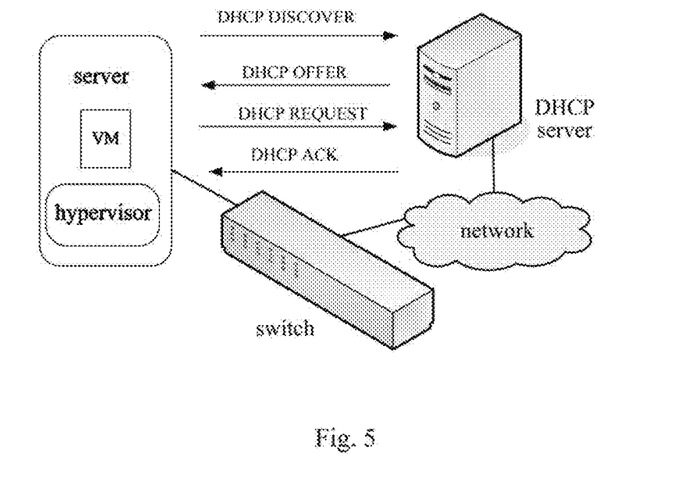
FIG. 5 shows an interactive process of a virtual machine with a DHCP server for obtaining an IP address.

FIG. 5 shows an interactive process of a virtual machine with a DHCP server for obtaining an IP address. As shown in FIG. 5, when a virtual machine desires to obtain an IP address, it first broadcasts a DHCP DISCOVER packet within its subnet for searching for and finding a DHCP server. Generally, the DHCP DISCOVER packet contains MAC address of the virtual machine which sends a request. When the DHCP server receives the broadcasted DHCP DISCOVER, it will assign an IP address for the requesting virtual machine and return a DHCP OFFER packet as a response to the virtual machine, which packet includes the IP address as well as corresponding lease time. In the prior art, there are a plurality of IP assigning methods, such as manual assignment, automatic assignment, dynamic assignment etc. Typically, the DHCP server selects the first free IP address from the address range which has not been leased and contains the IP address together with other TCP/IP settings in the DHCP OFFER packet. It will be appreciated that there might be a plurality of DHCP servers in the subnet, so the virtual machine might receive a plurality of DHCP OFFER packets from the plurality of DHCP servers. Thus, the virtual machine may choose to accept one of the plurality of DHCP OFFER packets. Then, the virtual machine broadcasts a DHCP REQUEST packet to all the DHCP servers in the subnet, wherein the DHCP REQUEST packet contains IP address of the chosen DHCP server so as to publish the chosen DHCP server. Correspondingly, after receiving the DHCP REQUEST packet, the chosen DHCP server will returns an IP address conformation message, i.e. a DHCP ACK packet to the virtual machine to confirm that the IP lease formally enters into force.

In an embodiment, a DHCP server sends the DHCP ACK message in form of broadcast. In this case, all switches in the subnet can directly monitor DHCP ACK messages as to any virtual machine. Therefore, at step 402, an IP confirmation message of any virtual machine in the subnet may be obtained by snooping broadcasted messages from the DHCP server. The any virtual machine may be either a virtual machine connected to the present switch (or referred to as a virtual machine related to the present switch), or a virtual machine carried by the present switch), or a virtual machine connected to other switches.

In an embodiment, a DHCP server only unicasts an IP confirmation message, i.e., a DHCP ACK packet, to the virtual machine requesting for an IP address. Therefore, for any one switch, it can only receive the unicasted IP confirmation message as to a virtual machine connected to the present switch from the DHCP server. In this case, the method of the embodiments of the present invention further comprises broadcasting within the subnet the IP confirmation message received in unicasting from the DHCP server. Correspondingly, at step 402, as to the virtual machine connected to the present switch, the present switch may directly obtain the IP confirmation message of the virtual machine by snooping the unicasted message from the DHCP server, and then broadcast the IP confirmation messages within the subnet. As to virtual machines connected to other switches, since the other switches also do further broadcasting for the unicast message, at step 402, the present switch may obtain IP confirmation messages of the virtual machines connected to other switches by snooping broadcasting from other switches.

The steps above are described now with the switch 1 in FIG. 1 as an example. As shown in FIG. 1, the switch 1 is connected with servers A and B which are respectively installed with virtual machines VM1-VM4. Therefore, the virtual machines VM1-VM4 are virtual machines connected to the present switch. The subnet further contains another switch 2 to which virtual machines VM5-VM6 are connected. In case that the DHCP server sends out IP confirmation messages DHCP ACK in broadcasting, the switch 1 may obtain IP confirmation messages of any of the virtual machines VM1-VM6 within the subnet by snooping broadcast from the DHCP server. In case that the DHCP server sends DHCP ACK packets in unicasting, the switch 1 can only obtain IP confirmation messages of the virtual machines VM1-VM4 connected to the present switch directly from the DHCP server. For the purpose that the other switch, i.e. switch 2 can learn IP confirmation messages of VM1-VM4, the switch 1 broadcasts these IP conformation messages within the subnet once it obtains the IP confirmation messages unicasted directed to VM1-VM4. Similarly, the switch 2 can broadcast the obtained IP confirmation messages unicasted as to the VM5-VM6. Therefore, for the switch 1, it can obtain IP confirmation messages of the virtual machines VM1-VM4 connected to the present switch by snooping the unicasted messages from the DHCP server, and obtain IP confirmation messages of the virtual machines VM5-VM6 connected to the other switch 2 by snooping the broadcast from the other switch 2, and thus obtain IP confirmation messages of any virtual machine in the subnet.

In order to broadcast the IP confirmation messages received in unicasting, in an embodiment, when receiving unicasted DHCP ACK packets, a switch will modify the target MAC address as FF:FF:FF:FF:FF:FF, modify the target IP as 255.255.255.255, recalculate IP head checksum and remain other fields the same, and thus it can broadcast the DHCP ACK packets in the subnet. In an embodiment, in order to avoid data loss, the DHCP ACK packets will be broadcasted for many times in the subnet.

Though the embodiments above describe IP confirmation messages taking DHCP ACK packet as an example, it can be appreciated, in other embodiments, the IP confirmation message may be in other formats or other forms.

Based on IP confirmation message of at least one virtual machine obtained at step 402, at step 404, IP information and connection information of the at least one virtual machine are recorded at least based on the IP confirmation message. It may be appreciated, IP information of the virtual machine includes IP address. In an embodiment, the IP information above further comprises a lease time corresponding to the IP address. In an embodiment, the connection information includes connection status information indicating whether corresponding virtual machine is connected to the present switch, and connection parameter information indicating concrete parameters of the connection. In an embodiment, the connection parameter information includes one or more of the following parameters: a port to which the virtual machine is connected, a VLAN identity, etc. Generally, IP information of a virtual machine, including IP address and lease time, can be obtained directly from the IP confirmation message. While in some embodiments, recording of connection information needs further reference and analysis of other information. For instance, the connection parameter information above usually depends on detection of connection parameters of the virtual machine by the switch. Therefore, the recording step 404 above at least is dependent on but not limited to IP relevant messages.

In an embodiment, a record table is maintained at step 404, and IP information and connection information of respective virtual machines are recorded in the record table. Concrete implementation of step 404 is described taking an example in form of a record table below. However, it may be appreciated, IP information and connection information of respective virtual machines may be recorded and organized in other formats.

In order to record information of respective virtual machines, according to an embodiment, at step 404, first, connection relationship between at least one virtual machine and the present switch is determined based on the IP confirmation message of the at least one virtual machine, which means to determine whether the at least one virtual machine is a virtual machine connected to the present switch or a virtual machine connected to other switches. Generally, the IP confirmation message contains information such as MAC address and IP address etc. of the corresponding virtual machine. As a switch maintains MAC addresses of all virtual machines carried by itself based on the MAC address in the IP confirmation message, the present switch may determine whether the corresponding virtual machine is connected to the present switch.

In an embodiment, based on the determined connection relationship between respective virtual machines and the present switch, different connection status information is used to indicate different connection relationship, e.g. in a record table. For instance, in an embodiment, connection status information of a virtual machine connected to the present switch is recorded as a first status, and connection status information of virtual machines connected to other switches is recorded as a second status. Specifically, the first status may be represented as "connected", "active", trusted status, etc.; correspondingly, the second status may be represented as "unconnected", "inactive", standby status, etc. In other examples, connection statuses of respective virtual machines may be recorded in other forms. It may be appreciated, the entry whose connection status information is the first status may form a trust list similar to that in the prior art as a basis for executing various security applications. In an embodiment, as to a virtual machine whose connection status information is the first status, the connection parameters thereof are further detected and recorded in connection information.

Figure 6A:
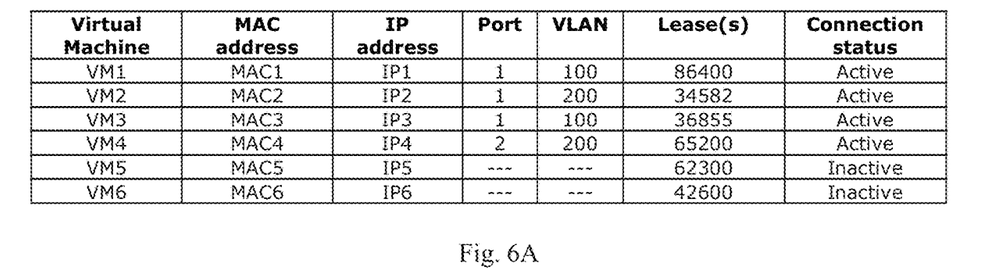
FIG. 6A shows an example of a record table according to one embodiment.

Below, still referring to switch 1 in FIG. 1 as the present switch, an example of the record table is described. FIG. 6A shows an example of a record table according to an embodiment. In the example as shown in FIG. 6A, the record table includes a plurality of entries, each of which records IP address, lease time, connection status information and connection parameter information of a virtual machine. As mentioned above, after the connection relationship is determined, the virtual machines installed at servers A and B are virtual machines connected to the present switch. Therefore, in the record table in FIG. 6A, connection status of the VM1-VM4 are recorded as "active". i.e. the first status. As to virtual machines VM5-VM6 connected to other switches, the connection statuses thereof are recorded as "inactive", i.e. the second status in the record table. As stated above, the entry whose connection status is the first status, i.e. "active", may be regarded as a trusted entry, the entry whose connection status is the second status may be regarded as a standby entry, and the trust entries are used for forming a trust list similar to that in the prior art.

Furthermore, as the virtual machines VM1-VM4 are carried by the present switch, the present switch may learn connection parameters such as connection ports, VLAN identities and record the connection parameter information in corresponding entries. As to the virtual machines VM5-VM6 connected to other switches, the present switch cannot determine the information thereof such as the connecting ports, so the parameter information such as connecting ports may be recorded as "unknown" (represented as " - - - " in the table) in corresponding entries in the record table.

Figure 6B:
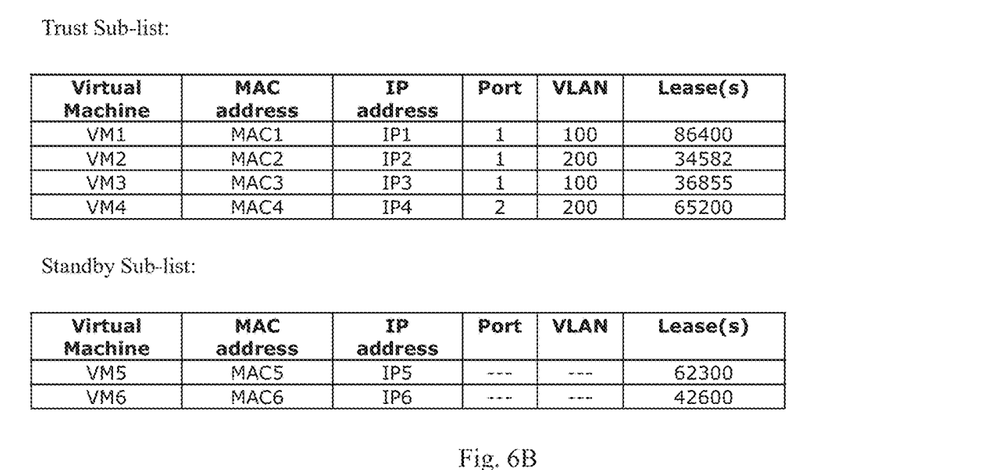
FIG. 6B shows an example of a record table according to another embodiment.

FIG. 6B shows an example of a record table according to another embodiment. In the example in FIG. 6B, the record table is divided into a trust sub-list and a standby sub-list, wherein the entries in the trust sub-list, also referred to as trust entries, are used for recording IP information and connection parameter information of the virtual machines (e.g. VM1-VM4) connected to the present switch, while the entries in the standby sub-list, also referred to as standby entries, are used for recording information of the virtual machines (e.g. VM1-VM4) connected to other switches. Now, the trust sub-list as shown in FIG. 6B has a function similar to that of the trust list in the prior art, as a basis for executing security applications. Though the record table in FIG. 6B does not include the item of "connection status", the sub-list where a virtual machine is located may reflect connection relationship between the virtual machine and the present switch, and thus reflect connection status of the virtual machine.

Although examples of the record table are described in connection with FIG. 6A and FIG. 6B, it may be appreciated that, the above examples intend to clearly illustrate the recording of IP information of various virtual machines, instead of imparting any limitation on the record table. The record table may include more or less entries as needed, and take other proper formats or forms.

Above, there is described the IP relevant information, such as a maintained record table, of the virtual machines recorded based on IP confirmation messages of the virtual machines obtained at step 402. It may be appreciated, in an embodiment, the IP relevant message interacted between a virtual machine with a DHCP server as to IP address of the virtual machine further includes an IP address release message for releasing the IP address. Therefore, the step 402 of obtaining an IP relevant message of at least one virtual machine may further comprise obtaining an IP release message of a certain virtual machine of the at least one virtual machine.

Specifically, when a certain virtual machine needs to release its IP address due to various reasons such as the lease expires, the virtual machine sends a DHCP RELEASE packet as an IP address release message to the DHCP server via the associated switch. Generally, the IP address release message is a unicast message. Therefore, only the switch associated with the virtual machine can snoop and directly obtain a packet of the IP address release message. For the purpose that other switches in the subnet may also learn release of the IP address by the virtual machine, the method of the embodiments of the present invention further comprises broadcasting the IP release message received in unicast by the virtual machine within the subnet. Correspondingly, for a specific switch, if the virtual machine which requests to release an IP address is a virtual machine connected to the present switch, it may obtain an IP release message of the virtual machine by snooping the unicast message from the virtual machine, and broadcast the IP release message within the subnet. As to virtual machines connected to other switches, as the other switches also further broadcast the unicast message, at step 402, the present switch may obtain an IP release message of the virtual machines by snooping the broadcast from other switches.

Based on the IP release message of a certain virtual machine obtained at step 402, step 404 of recording IP information of virtual machine includes deleting IP information of the certain virtual machine. In the example of recording IP information of a virtual machine with a record table, the record table is maintained at step 404; specifically, the entry corresponding to the certain virtual machine is deleted from the record table. After this, if the certain virtual machine requests to obtain an IP address again, according to preceding descriptions, the IP confirmation message of the certain virtual machine can be obtained again at step 402, and the record table can be maintained and updated based on this.

In some extreme cases, e.g., when a certain virtual machine cannot normally release IP address thereof due to various reasons such as forced shutdown, the virtual machine cannot send a DHCP RELEASE packet to a DHCP server via the associated switch as an IP address release message. In such a case, when IP lease of the virtual machine expires, the switch will also delete IP information of the virtual machine.

Thereby, the record table can be maintained and updated by obtaining IP relevant information of respective virtual machines, so that the record table may reflect the latest IP information of respective virtual machines in the subnet.

As stated above, maintenance of IP information of respective virtual machines is based on IP relevant messages of the at least one virtual machine obtained at step 402. The at least one virtual machine may include a virtual machine connected to the present switch, and further virtual machines connected to other switches. Therefore, in fact, each switch can record IP information of all virtual machines in the subnet into its record table. It may be appreciated, steps 402 and 404 are executed in response to modifications on IP addresses (requesting to obtain IP address or release the IP address) of virtual machines in the subnet. The record table thus maintained prepares for IP information synchronization in process of migration of virtual machines. Below, changes of the record table above when virtual machines are migrated are described.

As shown at step 406 in FIG. 4, in response to migration of a specific virtual machine of the at least one virtual machine, connection information of the certain virtual machine is modified.

In order to execute step 406, in an embodiment, the method of the present invention comprises detecting a migration of a virtual machine to determine migration direction of the migrating virtual machine.

As those skilled in the art know, in order to solve the problem of network edge virtualization, network bridge virtualization technologies are developed, in which a standard, IEEE 802.1Qbg, is proposed. In this standard, a Virtual Station Interface (VSI) Discovery and Configuration Protocol (VDP) is developed for discovering and configuring the VSI. By using the VDP, when a virtual machine is migrating, switches related to the migration may quickly discover VSI of the virtual machine so as to detect migration of the virtual machine. Besides using VDP for detecting a migration, other solutions in the prior art or proposed in the future may also be used to detect migration of virtual machines. For instance, in an example, a virtual machine migration tool may send a notification to switches of the virtual machine before and after the migration. By receiving such a notification, the switches before and after the migration may respectively detect migration-in and migration-out of the virtual machine.

Based on or parallel to detecting migration of virtual machines, the migration direction of a specific virtual machine which is migrating can be determined. In an embodiment, based on detecting migration-in of a specific virtual machine, the switch may determine whether the virtual machine comes from the same switch or not. In an example, the switch still uses the VDP mentioned above to determine whether the specific virtual machine which migrates in comes from the same switch or not. Specifically, the VDP identifies and associates VSI of the virtual machines, wherein identity information as to the VSI includes corresponding VLAN id, MAC address, VSI types etc. Through the information, a switch may identify whether a newly moved in virtual machine comes from the same switch. Furthermore, other solutions in the prior art may also be used for the determining.

Based on different migration directions of the specific virtual machine, information concerning the virtual machine is modified differently at step 406.

In an embodiment, the specific virtual machine migrates in from another switch. Now, the present switch had recorded IP information of the specific virtual machine. However, as the specific virtual machine was not connected to the present switch before the migration, initially, connection status of the specific virtual machine is recorded as the second status, e.g. inactive, unconnected, standby etc. in the record table. In response to migration-in of the specific virtual machine, at step 406, the connection statue information of the specific virtual machine is modified from the second status into the first status, so that the specific virtual machine is included in trust entries. Furthermore, once the specific virtual machine is migrated into the present switch, the present switch can determine connection parameters of the specific virtual machine, such as connecting port, VLAN identity etc. Therefore, at step 406, the determined connection parameter information of the specific virtual machine, such as connecting port, VLAN identity etc., is further recorded in the record table.

Figure 7:
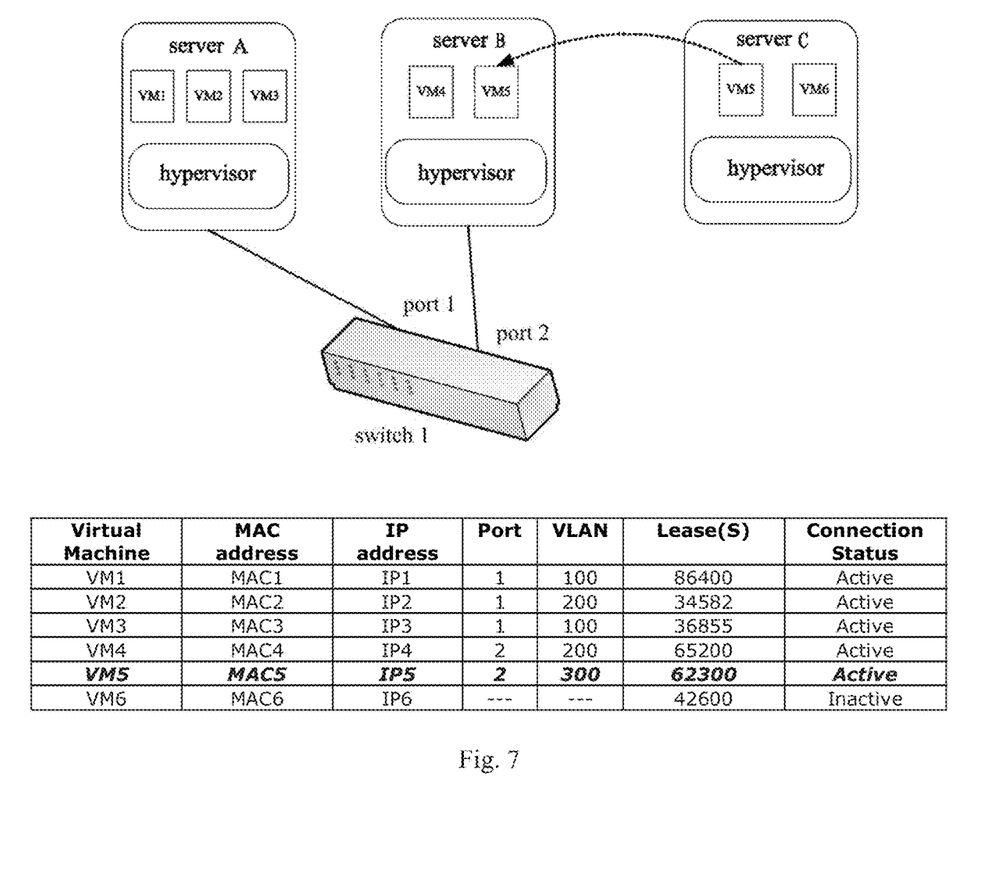
FIG. 7 shows a record table modified in response to migration of a virtual machine according to one embodiment.

Below, the process above is described still taking the switch 1 as an example. FIG. 7 shows a record table modified in response to migration of a virtual machine according to an embodiment. In FIG. 7, it is assumed that the virtual machine VM5 migrates from server C to server B. For switch 1, this means that the VM5 migrates from another switch to the present switch. The record table before the migration is shows in FIG. 6A, wherein IP information of the VM5 is recorded in standby entries. More specifically, connection status of the VM5 is recorded as "inactive", and the connection parameter is recorded as "unknown." In response to migration-in of the VM5, switch 1 modifies the entry of VM5, which means to modify the connection status thereof into the first status, i.e. "active" so as to contain the VM5 in trust entries. Furthermore, once it determines connection parameters of the VM5, the determined connection parameters are respectively recorded in corresponding entry of the VM5, including the connecting port, VLAN identity etc. Thereby, VM5 may starts working at once without needing to resend a request to a DHCP server.

In another embodiment, the specific virtual machine is migrated out from the present switch to another switch. It may be appreciated, as the specific virtual machine was connected to the present switch before the migration, connection status of the specific virtual machine was recorded as the first status in the record table initially. In response to migration-out of the specific virtual machine, at step 406, the connection statue of the specific virtual machine is modified from the first status into the second status, so that the specific virtual machine is moved from trust entries to standby entries. Furthermore, once the specific virtual machine is migrated out from the present switch, the present switch cannot learn certain concrete connection parameters, such as connecting port, VLAN identity etc. thereof. Therefore, at step 406, at least part of the connection parameters of the specific virtual machine is modified as unknown in standby entries. It may be appreciated, as security applications are executed only based on a trust list formed of trust entries, accuracy of connection parameters in the standby entries does not influence execution of the security applications. Therefore, in another embodiment, at step 406, the present switch only modifies connection status information of the virtual machines which are migrated out, but does not modify the connection parameters thereof.

Figure 8:
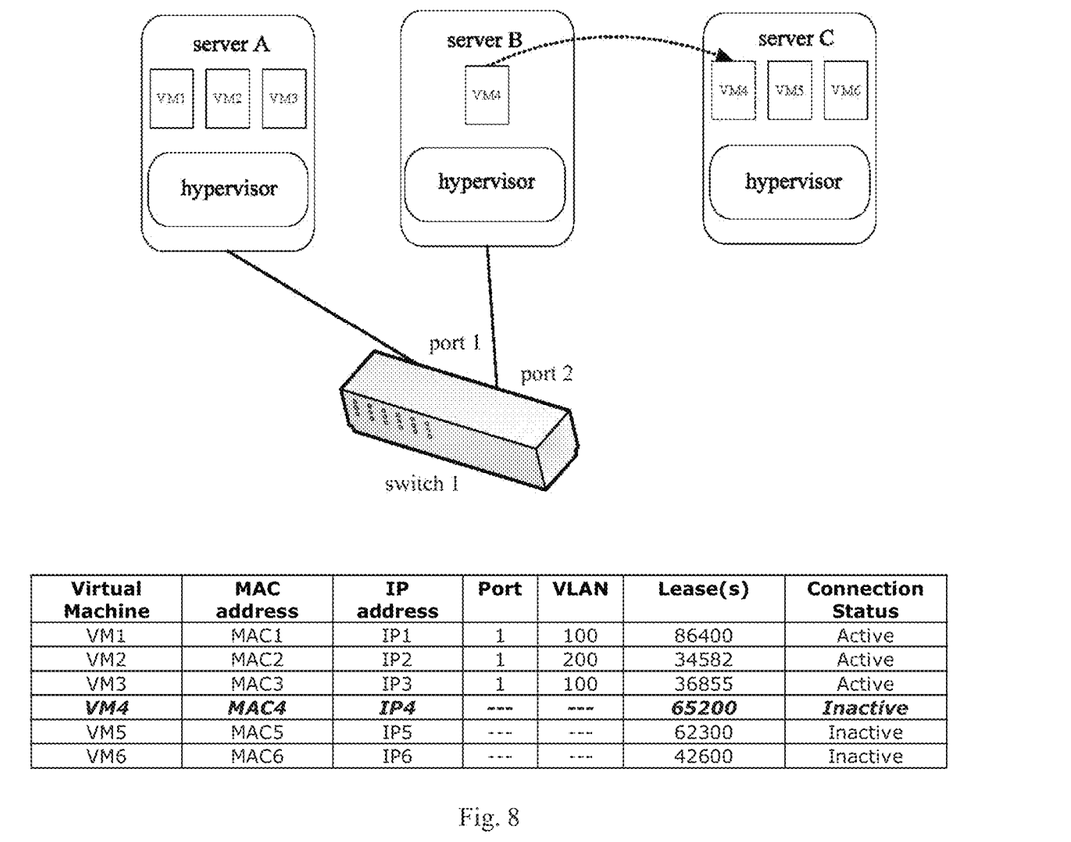
FIG. 8 shows a record table modified in response to migration of a virtual machine according to another embodiment.

FIG. 8 shows a record table modified in response to migration of a virtual machine according to another embodiment. In FIG. 8, it is assumed that a virtual machine VM4 is migrated from server B to server C. For switch 1, this means that the VM4 migrates out from the present switch. The record table before the migration is shows in FIG. 6A, wherein IP address, lease, connection status information and connection parameter information of the VM4 are recorded in trust entries. More specifically, connection status of the VM4 is recorded as "active", and the concrete respective connection parameters are further recorded. In response to migration-out of the VM4, the switch 1 modifies the entry of VM4, which means to modify the connection status thereof into the second status, i.e. "inactive" so as to move the VM4 to standby entries. Furthermore, in the example of FIG. 8, the switch 1 modifies part of connection parameters which could not be determined caused by migration-out of the VM4, such as connecting port, VLAN etc. as "unknown."

In yet another embodiment, a specific virtual machine is migrated within the present switch, which means that it is migrated from a first port of the present switch to a second port. In such a case, before and after the migration, the specific virtual machine is always connected to the present switch, so the present switch does not need to modify the connection status information of the virtual machine. Correspondingly, the specific virtual machine is recorded in trust entries of the record table both before and after the migration. However, as a result of the migration, connection parameters of the specific virtual machine, such as connecting port, are changed. Therefore, in step 406, at least part of the connection parameters of the specific virtual machine is modified in the record table. Specifically, in an example, connecting port, as a connection parameter, of the specific virtual machine is modified from the first port to the second port.

Figure 9:
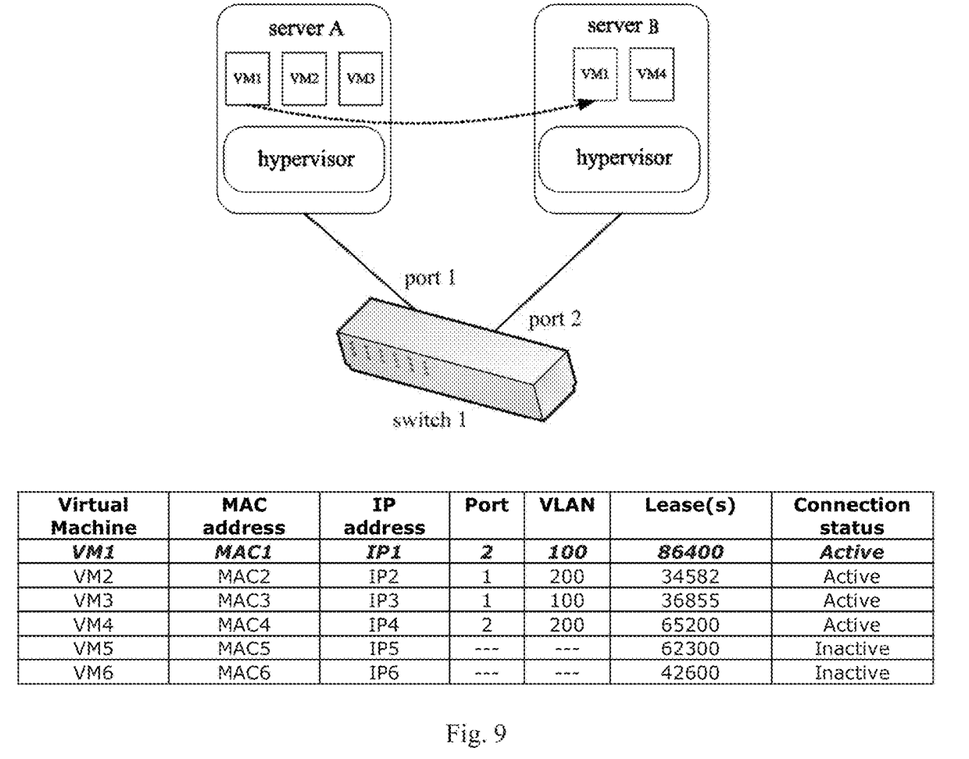
FIG. 9 shows a record table modified in response to migration of a virtual machine according to yet another embodiment.

FIG. 9 shows a record table modified in response to migration of a virtual machine according to yet another embodiment. In FIG. 9, it is assumed that a virtual machine VM1 is migrated from server A to server B. For switch 1, this means that the VM1 migrates within the present switch. The record table before the migration is shows in FIG. 6A, wherein IP information and connection parameters of the VM1 are recorded in trust entries. More specifically, connection status of the VM1 is recorded as "active", and the connection port in the connection parameters is recorded as port 1 (corresponding to server A). After the VM1 is migrated, it is still connected to the present switch 1; therefore, it does not need to modify the connection status information corresponding to the VM1. Nevertheless, the switch 1 would further detect whether other parameters are changed. Through the detection, it may determine, through the migration, connecting port of VM1 is changed. Therefore, in the record table, the switch 1 modifies connecting port of the VM1 into port 2 (corresponding to the server B). It may be appreciated, if other connection parameters are changed as a result of migration of the virtual machine, it further needs to modify other connection parameters.

In the embodiments above, it can be seen, as a switch regularly records IP information and connection information of respective virtual machines within a subnet, when a virtual machine is migrated, the switch does not need to resend a request to a DHCP server, but it only needs to update and modify connection information of the migrated virtual machine, and then the virtual machine will normally work immediately. Thereby, it avoids network disruptions caused by non-synchronization of IP information when the virtual machine is migrated.

Figure 10:
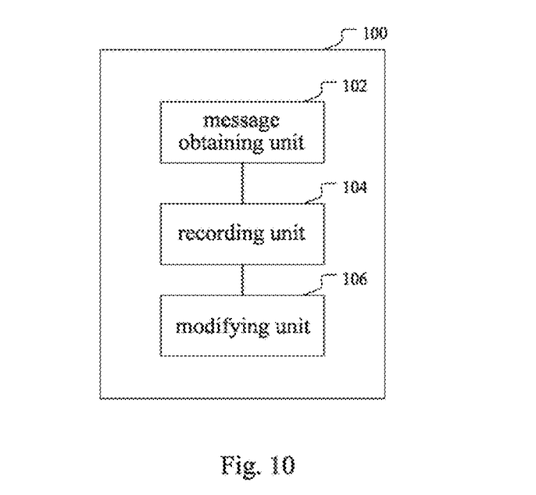
FIG. 10 shows a schematic diagram of an apparatus for synchronizing IP information according to one embodiment.

Based on the same inventive concept, an embodiment of the present invention further provides with an apparatus for synchronizing IP information of virtual machines in a switch. FIG. 10 shows a schematic diagram of an apparatus for synchronizing IP information according to an embodiment of the present application. In FIG. 10, the apparatus is indicated as 100 as a whole. As shown in the figure, the apparatus 100 for synchronizing IP information of virtual machines comprises: a message obtaining unit 102 configured to obtain an IP relevant message of at least one virtual machine within a subnet; a recording unit 104 configured to record IP information and connection information of the at least one virtual machine based on the IP relevant message; and a modifying unit 106 configured to modify, in response to migration of a specific virtual machine of the at least one virtual machine, connection information of the specific virtual machine.

According to an embodiment, the message obtaining unit 102 is configured to obtain an IP confirmation message of the at least one virtual machine by snooping broadcast from a DHCP server.

According to an embodiment, the message obtaining unit 102 is configured to obtain an IP confirmation message of a virtual machine of the at least one virtual machine that is connected to the switch by snooping a unicast message from a DHCP server, and broadcast the IP confirmation message in the subnet.

According to an embodiment, the message obtaining unit 102 is configured to obtain an IP confirmation message of a virtual machine of the at least one virtual machine that is connected to another switch by snooping broadcast from the another switch in the subnet.

According to an embodiment, the connection information comprises connection status information; and the recording unit is configured to record the connection status information of a virtual machine of the at least one virtual machine that is connected to the switch as a first status, and record the connection status information of a virtual machine of the at least one virtual machine that is connected to another switch as a second status.

According to an embodiment, the message obtaining unit 102 is configured to obtain an IP release message of a certain virtual machine of the at least one virtual machine; and the recording unit is configured to delete IP information of the certain virtual machine.

According to an embodiment, the modifying unit 106 is configured to modify the connection statue information of the specific virtual machine from the second status into the first status and record determined connection parameter information of the specific virtual machine in response to that the specific virtual machine is migrated in from another switch.

According to an embodiment, the modifying unit 106 is configured to modify the connection statue information of the specific virtual machine from the first status into the second status in response to that the specific virtual machine is migrated out from the switch.

According to an embodiment, the modifying unit 106 is configured to modify a connection parameter of the specific virtual machine in response to that the specific virtual machine is migrated within the switch.

Concrete executing manners of the apparatus 100 for synchronizing IP information of virtual machines may refer to descriptions above of the method in combination with concrete examples, which will not be detailed again for conciseness.

In an embodiment, the apparatus 100 is contained in a switch. In another embodiment, the apparatus 100 is embodied as an independent tool communicating with a switch.

Using the method and apparatus according to embodiments of the present invention, IP information and connection information of respective virtual machines within a subnet are recorded regularly. When a virtual machine is migrated, it only needs to update and modify connection information of the migrated virtual machine, but does not need to resend a request to a DHCP server. Thereby, it avoids network disruptions caused by non-synchronization of IP information when the virtual machine is migrated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for synchronizing internet protocol (IP) information of virtual machines in a switch, the method comprising:
   prior to a migration of a virtual machine within a subnet:
      obtaining, by a switch, an IP relevant message of the virtual machine within the subnet by snooping a transmission of another device in the subnet;
      recording, by the switch, IP information and connection information of the virtual machine based on the IP relevant message; and
   in response to migration of the virtual machine, modifying, by the switch, connection information of the virtual machine while maintaining the IP information of the virtual machine through migration.

2. The method according to claim 1, wherein the IP relevant message comprises the IP confirmation message of the at least one virtual machine, and wherein the transmission is the broadcast message from the DHCP server.

3. The method according to claim 1, wherein the IP relevant message comprises the IP confirmation message of a virtual machine of the at least one virtual machine hosted by the server that is connected to the switch, and wherein the transmission is the unicast message from the DHCP server.

4. The method according to claim 1, wherein the IP relevant message comprises the IP confirmation message of a second virtual machine of the at least one virtual machine that is hosted by another server that is connected to another switch in the subnet, and wherein the IP confirmation message is obtained by snooping a broadcast from the another switch in the subnet.

5. The method according to claim 4, wherein the connection information comprises:
   connection status information; and
   a lease time corresponding to the IP information, and wherein recording the IP information and the connection information of the at least one virtual machine comprises:
      recording the connection status information of a first virtual machine of the at least one virtual machine that is connected to the switch as a first status;
      recording the connection status information of the second virtual machine of the at least one virtual machine that is connected to another switch as a second status; and deleting IP information for a third virtual machine in response to a lease time corresponding to the IP information for the third virtual machine having expired.

6. The method according to claim 5, wherein the specific virtual machine is migrated in from another switch or migrated out from the switch, and wherein the switch modifying the connection information of the specific virtual machine comprises:
modifying the connection status information of the specific virtual machine from the second status into the first status and recording determined connection parameter information of the specific virtual machine in response to the specific virtual machine migrating in from another switch; and
modifying the connection status information of the specific virtual machine from the first status into the second status in response to the specific virtual machine migrating out from the switch.

7. The method according to claim 1, further comprising the switch maintaining a record table that stores the IP information and the connection information of virtual machines in the subnet, the record table comprising a plurality of entries, each entry storing information for a specific virtual machine including:
a media access control (MAC) address;
an IP address;
a port;
a virtual local area network (VLAN);
a lease time; and
connection status information indicating an active connection or an inactive connection.

8. The method according to claim 1, wherein the switch obtaining the IP relevant message of the at least one virtual machine within the subnet comprises obtaining an IP release message of a certain virtual machine of the at least one virtual machine, and
wherein the switch recording the IP information and connection information of the at least one virtual machine comprises deleting IP information of the certain virtual machine.

9. The method according to claim 1, wherein the IP relevant message is a unicasted DHCP ACK packet, and wherein the switch broadcasting the IP confirmation message within the subnet more than one time comprises, prior to broadcasting the IP confirmation message:
the switch modifying a target media access control (MAC) address of the DHCP ACK packet as FF:FF:FF:FF:FF:FF;
the switch modifying a target IP address as 255.255.255.255;
the switch recalculating an IP head checksum; and
the switch maintaining other fields of the DHCP ACK packet.

10. An apparatus for synchronizing internet protocol (IP) information of virtual machines in a switch, the apparatus comprising at least one hardware processor and logic integrated with and/or executable by the at least one hardware processor, the logic being configured as:
a message obtaining unit configured to obtain, prior to a migration of a virtual machine within a subnet, an IP relevant message of the virtual machine within the subnet by snooping a transmission of another device in the subnet;
a recording unit configured to record, prior to the migration of the virtual machine within the subnet, IP information and connection information of the virtual machine based on the IP relevant message; and
a modifying unit configured to modify, in response to migration of the virtual machine, connection information of the virtual machine while maintaining the IP information of the virtual machine through migration.

11. The apparatus according to claim 10, wherein the IP relevant message comprises the IP confirmation message of the at least one virtual machine, and wherein the transmission is the broadcast message from the DHCP server.

12. The apparatus according to claim 10, wherein the IP relevant message comprises the IP confirmation message of a virtual machine of the at least one virtual machine that is connected to the switch, wherein the transmission is the unicast message from the DHCP server, wherein the IP relevant message further comprises a unicasted DHCP ACK packet, and wherein the message obtaining unit is further configured to, prior to broadcasting the IP confirmation message:
modify a target media access control (MAC) address of the DHCP ACK packet as FF:FF:FF:FF:FF:FF;
modify a target IP address as 255.255.255.255;
recalculate an IP head checksum; and
maintain other fields of the DHCP ACK packet.

13. The apparatus according to claim 10, wherein the IP relevant message comprises the IP confirmation message of a second virtual machine of the at least one virtual machine that is hosted by another server that is connected to another switch in the subnet, and wherein the message obtaining unit is configured to obtain the IP confirmation message by snooping a broadcast from the another switch in the subnet.

14. The apparatus according to claim 13, wherein the connection information comprises connection status information, and wherein the recording unit is configured to:
record the connection status information of a first virtual machine of the at least one virtual machine that is connected to the switch as a first status; and
record the connection status information of the second virtual machine of the at least one virtual machine that is connected to another switch as a second status.

15. The apparatus according to claim 14, wherein the modifying unit is configured to modify the connection status information of the specific virtual machine from the second status into the first status and record determined connection parameter information of the specific virtual machine in response to that the specific virtual machine being migrated in from another switch.

16. The apparatus according to claim 14, wherein the modifying unit is configured to modify the connection status information of the specific virtual machine from the first status into the second status in response to the specific virtual machine being migrated out from the switch.

17. The apparatus according to claim 10, wherein the message obtaining unit is configured to obtain an IP release message of a certain virtual machine of the at least one virtual machine, wherein the recording unit is configured to delete IP information of the certain virtual machine, and wherein the recording unit is configured to maintain a record table that stores the IP information and the connection information of virtual machines in the subnet, the record table comprising a plurality of entries, each entry storing information for a specific virtual machine including:
a media access control (MAC) address;
an IP address;
a port;
a virtual local area network (VLAN);
a lease time; and connection status information indicating an active connection or an inactive connection.

18. The apparatus according to claim 10, wherein the modifying unit is configured to modify a connection parameter of the specific virtual machine in response to the specific virtual machine being migrated within the switch.

19. A computer program product, comprising a non-transitory computer readable storage medium having program instructions embodied therewith, the embodied program instructions readable/executable by a processor to cause the processor to perform a method comprising:

prior to a migration of a virtual machine within a subnet:
obtaining an IP relevant message of the virtual machine within the subnet by snooping a transmission of another device in the subnet;
recording IP information and connection information of the virtual machine based on the IP relevant message; and
modifying connection information of the virtual machine in response to migration of the virtual machine, while maintaining the IP information of the virtual machine through migration.

20. The computer program product as recited in claim 19, wherein the embodied program instructions are configured to snoop the IP relevant message of the at least one virtual machine within the subnet from the transmission selected from a group consisting of: the broadcast message from the DHCP server, the unicast message from the DHCP server, the IP confirmation message of a second virtual machine of the at least one virtual machine that is connected to another switch in the subnet, and the IP release message of the certain virtual machine of the at least one virtual machine, wherein the IP relevant message is a unicasted DHCP ACK packet that comprises the IP confirmation message of the at least one virtual machine, and wherein the method comprises, prior to broadcasting the IP confirmation message:

modifying a target media access control (MAC) address of the DHCP ACK packet as FF:FF:FF:FF:FF:FF;

modifying a target IP address as 255.255.255.255;

recalculating an IP head checksum; and maintaining other fields of the DHCP ACK packet.

* * * * *